Figure 1:
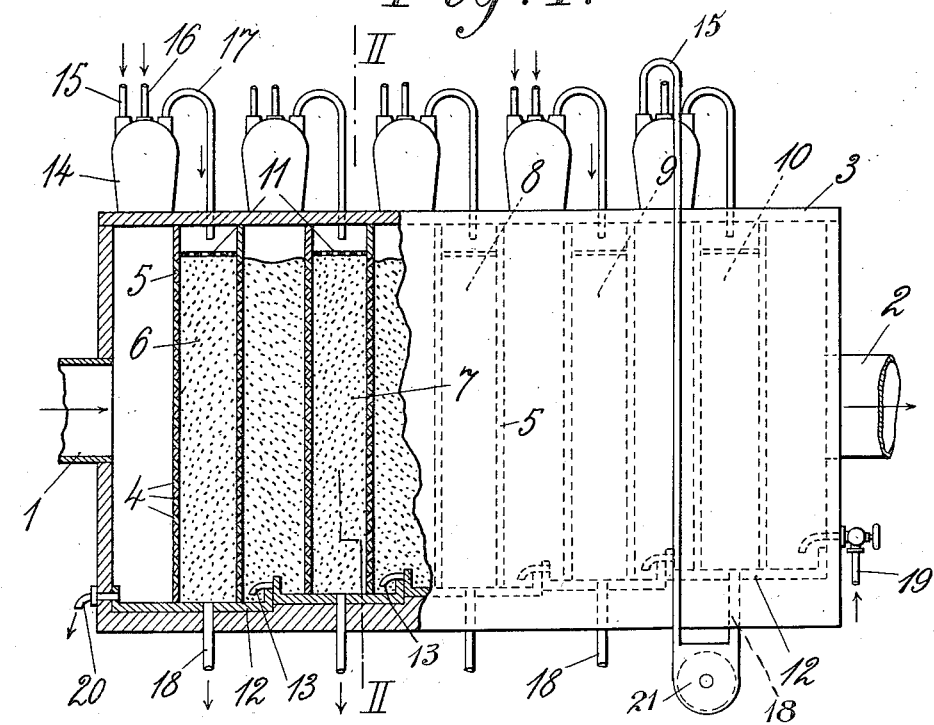

I. MOSCICKI.
APPARATUS FOR ABSORPTION OF DILUTE GASES BY LIQUIDS.
APPLICATION FILED AUG. 17, 1911.

1,046,212.

Patented Dec. 3, 1912.

Witnesses:
L. H. Staaden
Anna Hoyer

Inventor:
Ignacy Moscicki

UNITED STATES PATENT OFFICE.

IGNACY MOSCICKI, OF FRIBOURG, SWITZERLAND.

APPARATUS FOR ABSORPTION OF DILUTE GASES BY LIQUIDS.

1,046,212. Specification of Letters Patent. Patented Dec. 3, 1912.

Application filed August 17, 1911. Serial No. 644,579.

*To all whom it may concern:*

Be it known that I, IGNACY MOSCICKI, a subject of the Czar of Russia, and residing at Fribourg, Switzerland, have invented a certain new and useful Improved Apparatus for Absorption of Dilute Gases by Liquids, of which the following is a specification.

My invention relates to apparatus for the absorption of dilute gases by liquids.

If, during the absorption of gases by liquids, the gas to be absorbed is strongly diluted by other gases, when the product of reaction with the liquid is to be obtained having a high degree of concentration the absorbing liquid must be caused to pass through the same absorbing layer several times in order to be gradually enriched with absorbed gases. Consequently, it is not possible in one single column, working on the counter-current principle, simultaneously to bring fresh gases into contact with enriched liquid and very poor gases with fresh liquid. Therefore, a plurality of layers of filling material have been serially connected. In each layer or column of filling material the same absorbing liquid is raised several times to the top of the column and then is allowed to pass down through the layer of filling material. From time to time, the absorbing liquid is transferred from one column to another, while the gases pass through the columns in the reverse order, so that the richest gases are caused to enter the column of filling material containing the most concentrated liquid, and, as the gases become poorer through absorption, they pass through the columns of filling material containing fresher liquid. In the last column, the almost entirely exhausted gases come into contact with entirely fresh liquid. The most concentrated liquid, after having been in contact with the richest gases in the first column is drawn off, in order to make room for less concentrated liquid, which passes in a direction opposite to that of the flow of the gases on the counter-current principle. Such an arrangement requires a large number of columns of filling material.

Now, I have discovered that, by employing filling material of small individual size, a much greater area of contact can be provided between the gases and the absorbing liquid than by using filling material composed of comparatively large individual parts. Thus, one is enabled to considerably reduce the volume of the single columns of filling material, without any detriment to their efficiency. I have also discovered that by periodically pouring over the columns of filling material such a quantity of liquid that a continuous column is formed, all parts of the column are temporarily immersed in the liquid. In this way, not only the filling material can be fully utilized, but the thickness of each layer, or column, can be greatly reduced in the direction of the flow of the gases, say to a minimum of from 15 to 30 centimeters. In accordance with these discoveries, I have constructed an apparatus for the absorption of dilute gases by liquids, containing an inclosed space, which is wholly or partly filled with a suitable filling material and through which the gases are caused to pass in a horizontal direction, while the liquid for absorbing the gases flows through the columns in a perpendicular direction and, being periodically discharged, passes through the filling material in the form of a continuous column. In this manner, the gases will be fully absorbed by the liquid, notwithstanding the fact that the direction of flow of the liquid is at right angles to the direction of movement of the gases to be absorbed.

The apparatus can be used, for instance, for the purpose of absorbing oxids of nitrogen, which gases are now produced in large volumes by the combustion of atmospheric air in an electric high potential arc. Such gases are used in the manufacture of nitric acid and nitric acid salts and are greatly diluted with atmospheric air. Where the apparatus is used for absorbing oxids of nitrogen, the liquid, which is poured over the filling material, is water containing nitric acid, and the filling material may be quartz rock, or it may be composed of little pieces of glass having a dimension of from about 5 to 10 millimeters in length and 3 to 10 millimeters in width.

Figure 2:
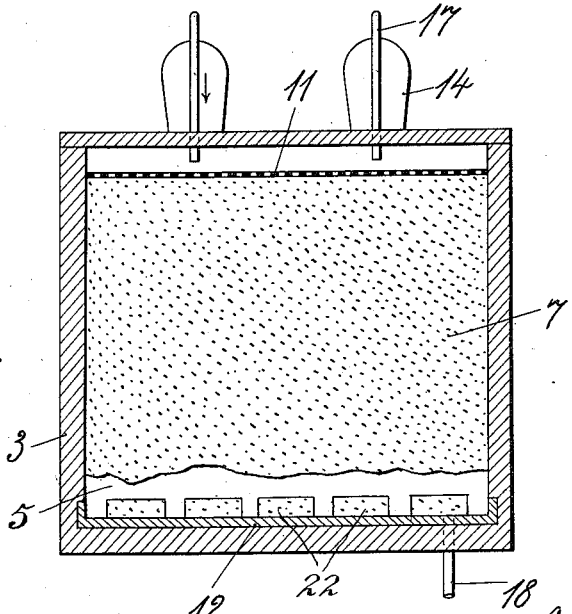

In the drawing, in which one construction of my new apparatus is shown by way of example, Figure 1 is a side elevation partly in section showing my improved apparatus, and Fig. 2 is a cross-section taken in the plane II—II in Fig. 1.

Small filling material is contained in a tightly closed chamber 3 having a gas inlet pipe 1 and a gas outlet pipe 2, the gases flowing through the said chamber in the direction of the two horizontal arrows. In order to enable the above described mode of showering with a continuous column perpendicularly to the direction of motion of the gases, the filling material is separated into single layers 6, 7, 8, 9 and 10 by walls or partitions 5 having apertures 4. The partitions extend across the whole width of the chamber and the apertures or perforations 4 are so numerous that the section of passage for the gases flowing through the apparatus is not materially changed. The partitions need not possess any special qualities of strength because they are supported at both sides by filling material. Each absorbing layer is covered with a perforated plate or distributers 11, and under each absorbing layer is a collecting receptacle or tank 12 for collecting the absorbing liquid passing through the appertaining absorbing layer. The tanks, when viewed from the gas inlet pipe 1, are arranged stepwise up to the rear end of the chamber and each communicates with the neighboring one by way of an overflow pipe 13. To this end the partitions 5 are notched at the bottom, as shown at 22 in Fig. 2. The absorbing liquid, e. g. water, is supplied by means of compressed air vessels 14, two or more of which belong to each layer. Liquid and compressed air supply pipes 15 and 16 respectively communicate with each of these vessels, and a liquid discharge pipe 17 leads to the chamber or space above the strainer or perforated plate 11 on each layer. Each layer is showered separately and periodically by introducing compressed air into the vessels 14 filled with water, whereby these vessels are rapidly emptied over the layers of filling material. There is thus formed each time in each layer a continuous column of water which, while sinking, places all parts of the layer under water and thus thoroughly washes them. Pipes 18 open into the bottoms of the tanks 12, and every time the absorbing layers are washed or rinsed, the said pipes 18 convey the liquid collected in the tanks to pumps, 21, by means of which the liquid can be again conveyed into the compressed air vessels 14 and thence onto the absorbing layers. Consequently, the same quantity of liquid can circulate several times in one layer and become highly enriched with the gas to be absorbed.

The various absorbing layers are showered separately, as already stated, with liquid whose concentration decreases from the first layer 6 next to the gas inlet pipe 1 toward the succeeding layers. The gases entering the chamber through the pipe 1 first meet with highly concentrated liquid, while the exhausted gases passing through the last layers of filling material contact with fresh or strongly diluted absorbing liquid. Fresh absorbing liquid is supplied through the pipe 19 communicating with the top tank 12. When fresh absorbing liquid is supplied and the quantity of liquid circulating in the rearmost layer 10 consequently increases, this surplus is delivered through the overflow pipe 13 to the next tank and its absorbing layer 9. As compared with the fresh liquid supplied to the layer 10, the surplus liquid delivered in the next tank has a higher degree of concentration. As this is repeated in the remaining layers, owing to the arrangement of the tanks the abovementioned graduated concentration of the absorbing liquid in the various layers is established and maintained. The concentrated liquid is withdrawn from the apparatus through the pipe 20 communicating with the lowermost tank. It is obvious from the above that each filling layer together with the showered means forms a self-contained and self-operating absorbing chamber, which, however, possesses gastight walls only at a very small part of its periphery which also belongs to the external wall of the whole apparatus.

As stated above, each time the vessels 14 are emptied, there is formed in each layer of filling material a continuous column of water. As the vessels 14 contain a large volume of water, which is rapidly poured out over the layers, the collecting tanks 12 at the bottom of the layers become suddenly filled with the liquid, which is only slowly and gradually drawn off by the pump through pipes 18. If, therefore, through pipe 19 fresh absorbing liquid is admitted into the highest collecting tank, part of the liquid in said higher tank will flow into the adjacent lower tank and so forth, until the liquid finally reaches the pipe 20 at the gas-inlet end of the apparatus, where it is drawn off. The speed of flow of the liquid through pipe 20 depends on the amount of the fresh absorbing liquid, which is supplied through inlet pipe 19 at the gas outlet end of the apparatus. The fresh absorbing liquid, as it passes through the several layers of filling material becomes more and more concentrated and enriched with the gases flowing in the opposite direction, so that when the liquid reaches the first layer 6 it is highly concentrated and the gases entering through inlet pipe 1 come in contact with the highly concentrated liquid. As the gases then pass on through the several layers, they come in contact with less concentrated liquid, until in the last layer they come in contact with the fresh absorbing liquid supplied through pipe 19.

The space between every two absorbing layers filled with fine granular material may, of course, vary in size. These chambers are particularly for condensing the mist formed in the absorbing layers when the gases flowing therethrough exceed a certain velocity of flow. The said chambers also keep contiguous absorbing layers at such a distance apart that liquid cannot pass from one into another.

The above-described apparatus may comprise any number of absorbing layers depending on the quantity of gas to be absorbed during certain periods, such layers being connected together and not separated by partitions; gases can traverse the apparatus in its whole extent without the section of passage for the gases undergoing any material change at any part with the exception of the inlet and outlet pipes. As compared with the ordinary absorbing systems, when the same quantity of gas is to be treated the present apparatus therefore occupies much less space. Further, since the absorption spaces are provided in one and the same chamber, the parts of the apparatus which must be shut off externally are reduced to a minimum which, of course, means a considerable reduction of the prime cost.

I claim:—

1. Apparatus for the absorption of dilute gases by liquids, comprising an air-tight closed chamber, adapted to receive columns of suitable filling material and having a gas inlet and liquid outlet at one end and a gas outlet and liquid inlet at the other end, a plurality of vertical partitions in said chamber, separating the several columns of filling material and provided with perforations arranged so as to cause the gases to flow successively through the several layers in a horizontal direction, means for supplying liquid separately to each column of filling material in such quantity as to produce a continuous column of liquid passing through the entire column in a direction perpendicular to the flow of the gases.

2. Apparatus for the absorption of dilute gases by liquids, comprising an air-tight closed chamber adapted to receive columns of suitable filling material and having a gas inlet and liquid outlet at one end and a gas outlet and liquid inlet at the other end, a plurality of vertical partitions in said chamber provided with perforations, separating the several columns of filling material and arranged so as to cause the gases to flow successively through the several layers in a horizontal direction, means for supplying liquid separately to each column of filling material in such quantity as to produce a continuous column of liquid passing through the entire column in a direction perpendicular to the flow of the gases, and means for collecting the liquid at the bottom of each layer, and means for intermittently and rapidly pouring out the collected liquid over the top of each layer.

3. Apparatus for the absorption of dilute gases by liquids, comprising an air-tight closed chamber, adapted to receive columns of suitable filling material and having a gas inlet and liquid outlet at one end and a gas outlet and liquid inlet at the other end, a plurality of vertical partitions in said chamber, separating the several columns of filling material and provided with perforations arranged so as to cause the gases to flow successively through the several columns in a horizontal direction, means for supplying liquid separately to each column of filling material in such quantity as to produce a continuous column of liquid passing through the entire column in a direction perpendicular to the flow of the gases, a basin under each layer for collecting the liquid, the basins for the several columns being stepped up toward the gas outlet end of the apparatus, thereby causing part of the liquid to flow from each of said basins to the next lower basin toward the gas inlet end of the apparatus in a direction opposite to the direction of the flow of the gases.

4. Apparatus for the absorption of dilute gases by liquids, comprising an air-tight closed chamber, adapted to receive the columns of suitable filling material and having a gas inlet and liquid outlet at one end and a gas outlet and liquid inlet at the other end, a plurality of perforated vertical partitions in said chamber, separating the several columns of filling material and arranged so as to cause the gases to flow successively through the several columns in a horizontal direction, means for supplying liquid separately to each column of filling material in such quantity as to produce a continuous column of liquid passing through the entire column in a direction perpendicular to the flow of the gases, a basin under each column for collecting the liquid, the basins for the several columns being stepped up toward the gas outlet end of the apparatus, thereby causing part of the liquid to flow from each of said basins to the next lower basin toward the gas inlet end of the apparatus in a direction opposite to the direction of the flow of the gases, means for supplying fresh absorbing liquid at the gas outlet end of the casing and means for drawing off the concentrated liquid at the gas inlet end of the apparatus.

In testimony whereof, I affix my signature in the presence of two witnesses.

IGNACY MOSCICKI.

Witnesses:
 JULIUS WEBER,
 FRIEDRICH NONZELI.